(12) United States Patent
Yang et al.

(10) Patent No.: US 8,774,493 B2
(45) Date of Patent: Jul. 8, 2014

(54) APPARATUS FOR FORMING IMAGE FOR PATTERN MATCHING

(75) Inventors: Kyoungmo Yang, Hitachinaka (JP); Yuichi Abe, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 11 days.

(21) Appl. No.: 13/575,531

(22) PCT Filed: Jan. 28, 2011

(86) PCT No.: PCT/JP2011/051721
§ 371 (c)(1),
(2), (4) Date: Jul. 26, 2012

(87) PCT Pub. No.: WO2011/093436
PCT Pub. Date: Aug. 4, 2011

(65) Prior Publication Data
US 2012/0308152 A1    Dec. 6, 2012

(30) Foreign Application Priority Data

Jan. 28, 2010   (JP) ................ 2010-016159

(51) Int. Cl.
G06K 9/00          (2006.01)
(52) U.S. Cl.
USPC .......................... 382/145; 382/141
(58) Field of Classification Search
None
See application file for complete search history.

(56) References Cited

U.S. PATENT DOCUMENTS

| | | |
|---|---|---|
| 7,235,782 B2 | 6/2007 | Takane et al. |
| 7,457,736 B2 | 11/2008 | Chang |
| 7,732,761 B2 | 6/2010 | Tanaka et al. |
| 8,285,031 B2 | 10/2012 | Kitamura et al. |
| 8,305,435 B2 | 11/2012 | Sato et al. |
| 2002/0158199 A1* | 10/2002 | Takane et al. ............... 250/310 |
| 2003/0173516 A1* | 9/2003 | Takane et al. ............... 250/310 |
| 2004/0081350 A1* | 4/2004 | Kitamura et al. ........... 382/149 |
| 2004/0264759 A1* | 12/2004 | Hattori et al. ............... 382/145 |
| 2005/0100205 A1 | 5/2005 | Shishido et al. |
| 2005/0169513 A1* | 8/2005 | Yoshikawa et al. ......... 382/149 |
| 2005/0226494 A1* | 10/2005 | Yamamoto et al. .......... 382/149 |
| 2005/0232477 A1* | 10/2005 | Sugihara et al. ............ 382/149 |

(Continued)

FOREIGN PATENT DOCUMENTS

| | | |
|---|---|---|
| JP | 62-2116 A | 1/1987 |
| JP | 6-96214 A | 4/1994 |

(Continued)

OTHER PUBLICATIONS

International Search Report with English translation dated Mar. 1, 2011 (four (4) pages).

(Continued)

*Primary Examiner* — Sean Motsinger
(74) *Attorney, Agent, or Firm* — Crowell & Moring LLP

(57) ABSTRACT

The present invention is a device that creates a template based on design data without performing an exposure simulation, etc., and an object thereof is to provide a pattern matching image forming device capable of forming an image that is commensurate with the size of the actual pattern. As one mode for achieving the object above, there is proposed a pattern matching image forming device that, in forming a matching image, shrinks or enlarges design data based on a desired pattern size, and that forms a matching image based on a pattern thus shrunk or enlarged.

6 Claims, 13 Drawing Sheets

(56) References Cited

U.S. PATENT DOCUMENTS

| | | | |
|---|---|---|---|
| 2006/0045326 A1* | 3/2006 | Toyoda et al. | 382/145 |
| 2006/0126916 A1* | 6/2006 | Kokumai | 382/151 |
| 2006/0193508 A1* | 8/2006 | Sutani et al. | 382/145 |
| 2006/0245636 A1* | 11/2006 | Kitamura et al. | 382/149 |
| 2006/0262977 A1* | 11/2006 | Mitsui | 382/209 |
| 2006/0288325 A1 | 12/2006 | Miyamoto et al. | |
| 2007/0223803 A1* | 9/2007 | Shindo et al. | 382/145 |
| 2008/0310702 A1 | 12/2008 | Taguchi et al. | |
| 2009/0202139 A1* | 8/2009 | Toyoda et al. | 382/145 |
| 2009/0208090 A1* | 8/2009 | Nishiura et al. | 382/149 |
| 2009/0214103 A1 | 8/2009 | Tanaka et al. | |
| 2011/0142326 A1* | 6/2011 | Shinoda et al. | 382/149 |
| 2012/0002861 A1* | 1/2012 | Nishiura et al. | 382/149 |
| 2012/0207397 A1* | 8/2012 | Nagatomo et al. | 382/218 |

FOREIGN PATENT DOCUMENTS

| | | |
|---|---|---|
| JP | 7-113854 A | 5/1995 |
| JP | 2000-236007 A | 8/2000 |
| JP | 2000-266706 A | 9/2000 |
| JP | 2002-328015 A | 11/2002 |
| JP | 2004-95657 A | 3/2004 |
| JP | 2004-219343 A | 8/2004 |
| JP | 2006-66478 A | 3/2006 |
| JP | 2006-351746 A | 12/2006 |
| JP | 2007-5818 A | 1/2007 |
| JP | 2007-218711 A | 8/2007 |
| JP | 2008-164593 A | 7/2008 |
| JP | 2008-224365 A | 9/2008 |
| JP | 2008-232933 A | 10/2008 |
| JP | 2009-198339 A | 9/2009 |

OTHER PUBLICATIONS

Form PCT/ISA/237 (three (3) pages).
Japanese-language Office Action dated Oct. 29, 2013 (Three (3) pages).

* cited by examiner

APPARATUS FOR FORMING IMAGE FOR PATTERN MATCHING

TECHNICAL FIELD

The present invention relates to a pattern matching image forming method and a pattern matching image forming device, and, more particularly, to a method and device for forming an image for pattern matching based on the design data of a sample.

BACKGROUND ART

In measuring a sample, or in an inspection device, using an electron microscope (Scanning Electron Microscope: SEM), etc., pattern matching using a reference image (hereinafter also referred to as a template) is performed in order to make fine measurements or to identify the position of an inspection target. In addition, since forming methods that cut out, from an actual SEM image, a region that is to serve as a template are only capable of creating a template after an actual pattern has been formed, and since they involve some effort, methods that create a template using design data for a semiconductor device, a photomask, etc., are beginning to be adopted.

In Patent Document 1, there is described a method of forming an image approximating the actual image by performing a smoothing process on design data that is to serve as a template, and thickening pattern line segments. In addition, in Patent Documents 2 and 3, there are described methods in which a pattern that is to serve as a template is made to resemble the actual image by performing simulation on design data. Further, in Patent Document 4, there is described a method of forming a template having white bands resembling the actual image by adjusting each line segment of the design data.

CITATION LIST

Patent Literature

Patent Document 1: JP Patent Application Publication (Kokai) No. 2002-328015 A (counterpart U.S. Pat. No. 7,235,782)
Patent Document 2: U.S. Pat. No. 7,457,736
Patent Document 3: JP Patent Application Publication (Kokai) No. 2000-236007 A
Patent Document 4: JP Patent Application Publication (Kokai) No. 2006-66478 A (counterpart US Patent Application Publication No. 2006/0045326)

SUMMARY OF INVENTION

Technical Problem

With the methods disclosed in Patent Documents 1 and 4, while it may be possible to make pattern line segments of design data resemble the actual image in shape, they are incapable of sufficiently accommodating changes in the size of the pattern that occur due to pattern exposure conditions, etc. Further, with methods that form an image resembling an image of the pattern that is actually formed by simulating the post-exposure pattern, as described in Patent Documents 2 and 3, while it may be possible to form images resembling the actual pattern as long as the precision of the simulation is high, in order to improve precision, numerous conditions must be set up, and it also takes considerable experience and time to perform the simulation. In addition, since simulations must be performed for each exposure condition of an optical exposure device, or for each different device, creating templates requires considerable effort.

A pattern matching image forming method and pattern matching image forming device, namely a method and device for creating a template based on design data without performing exposure simulations, etc., and whose object is to form an image that is commensurate with the size of the actual pattern, are described below.

Solution to Problem

As one mode for attaining the object above, there are proposed a pattern matching image forming method and pattern matching image forming device that shrink or enlarge design data based on a desired pattern size in forming an image for matching, and that form the image for matching based on the shrunk or enlarged pattern.

In addition, there are proposed a pattern matching image forming method and pattern matching image forming device that perform, on a pattern that has been shrunk or enlarged based on a desired pattern size, a pattern corner part rounding process based on the desired pattern size.

Advantageous Effects of the Invention

With the arrangement above, it becomes possible to create, with ease, a matching image resembling the pattern of the actual image without requiring such effort as exposure simulation, etc.

DESCRIPTION OF EMBODIMENTS

Figure 1:
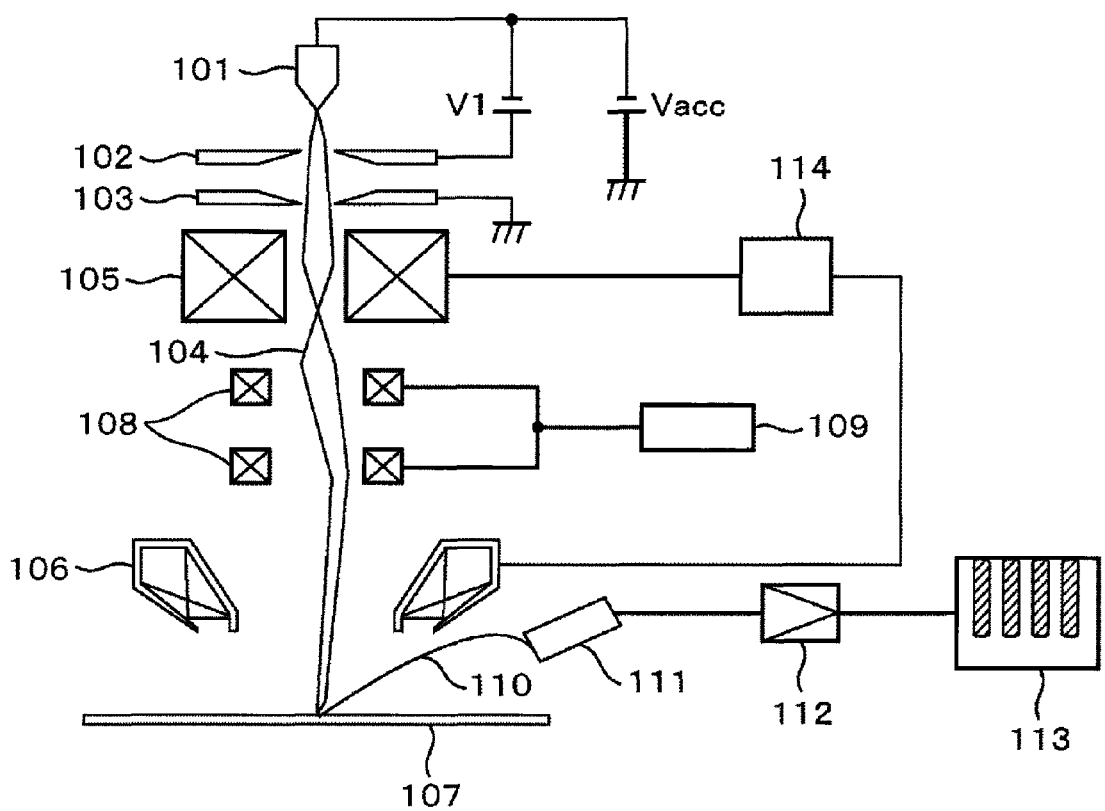
FIG. 1 is a schematic configuration diagram of a scanning electron microscope.

As one type of semiconductor measurement device, there is the SEM (Scanning Electron Microscope), which measures fine line widths of semiconductor wafer patterns. As methods for positioning the field of view (FOV) of an SEM at an extremely small measurement target from among a searched image, template matching techniques are known. For images used as templates, SEM images actually obtained with an SEM have conventionally been used. However, recently, methods in which a template is created from design data of semiconductor devices are beginning to be used. As such template creation methods based on design data, the following three types are conceivable. The first is a method that uses unprocessed design data as is. By way of example, although contact holes are often circular in actual images, they are square in design data. The second is a method that uses design data for a photomask, which is design data with an OPC (Optical Proximity Correction) pattern. The third is a method that uses design data on which a lithography simulation has been performed. Since the pattern to be formed on a semiconductor wafer is predictable through simulation, it is possible to reproduce a pattern that is relatively similar to the pattern in the actual image.

However, lithography simulation requires complex conditions to be set up, e.g., exposure device conditions, the material of the pattern to be formed, etc., and it takes a considerable amount of time to obtain appropriate simulation results. In particular, when creating pattern contours based on lithography simulation, setting up conditions thereof would require at least approximately 10 to 20 types of conditions to be set, and finding appropriate combinations from thereamong would require considerable skill.

A morphing method for a pattern suitable for matching with an actual image, wherein, in forming a template for pattern matching based on design data, there is no need, for example, to set up exposure conditions, etc., is described below, as well as a device used for such morphing, and a computer program executed by a computer (or a storage medium storing a computer program).

In the present embodiment, descriptions are provided mainly with respect to examples where a pattern shape of design data is morphed based on a desired size of a pattern to be formed on a sample. A designer designing a semiconductor pattern designs layout data, etc., of the pattern so that the pattern that is actually formed would be of a desired pattern size. If a template can be created based on such a desired pattern size, it becomes possible to create with ease a template that resembles the actual image without having to perform simulations, etc. By using the desired pattern size with respect to a length measurement point in morphing design data, it becomes possible to morph design data with ease regardless of complex exposure device condition settings, variations in the types of materials, etc.

In the present embodiment, in morphing design data using a desired pattern size for a length measurement point, descriptions will be provided mainly with respect to the adjustment of the level of rounding of the vertices of the pattern relative to the desired pattern size, and to the adjustment of the thickness of pattern edges.

With the present embodiment, it becomes possible to create a high-precision and simple image recognition template that uses design data and that is not dependent on the engineer's skill. In addition, according to research by the present inventors, it has been found that template creation time may be reduced to approximately 1/10 of the time it takes to perform lithography simulation. Thus, the time it takes to create a recipe for operating a scanning electron microscope may be shortened, potentially contributing to productivity improvements for semiconductor devices. A method of morphing design data based on a desired pattern size is described below using the drawings.

FIG. 1 is a schematic configuration diagram of a scanning electron microscope. A primary electron beam 104 applied by a cathode 101 and a first anode 102 is accelerated by a voltage Vacc applied to a second anode 103, and proceeds to a subsequent lens system. The primary electron beam 104 is focused to a fine spot on a wafer (sample) 107 by a condenser lens 105 and an objective lens 106 controlled by a lens controlling power source 114, and is scanned two-dimensionally across the wafer (sample) 107 by two-stage deflection coils 108. The scanning signal of the deflection coils 108 is controlled by a deflection control device 109 in accordance with the observation magnification. Secondary electrons 110 generated from the sample by the primary electron beam 104 with which the wafer (sample) 107 is scanned are detected at a secondary electron detector 111. Secondary electron information detected at the secondary electron detector 111 is amplified at an amplifier 112 and displayed on a CRT 113. With the scanning electron microscope shown in FIG. 1 by way of example, an automatic measurement of the pattern is performed using sample shape information displayed on the CRT 113.

Figure 12:
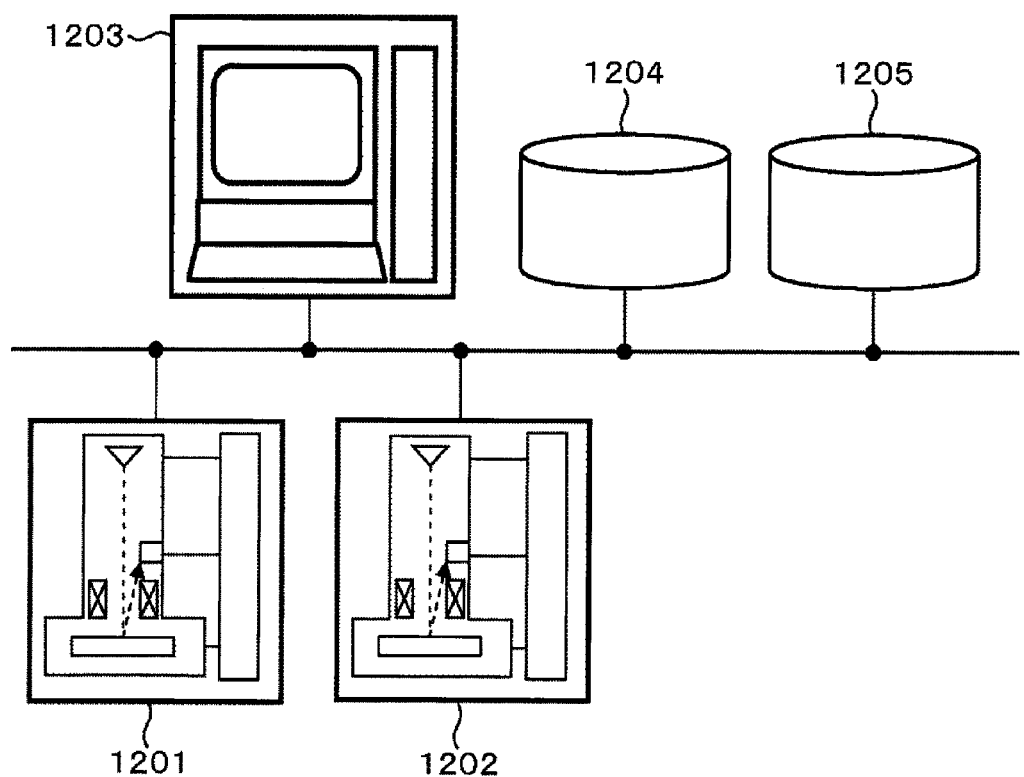
FIG. 12 is a diagram illustrating an example of a measuring/inspection system comprising charged particle beam devices.

FIG. 12 is a diagram illustrating an example of a measurement system in which a data management device 1203 and a plurality of measurement devices are connected via a network. The measurement devices are Critical Dimension-Scanning Electron Microscopes (CD-SEMs) that measure the dimensions of patterns. In the example in FIG. 12, two CD-SEMs 1201 and 1202 are connected to the network.

Each of the CD-SEMs 1201 and 1202 is connected to its own control device, where control that is needed for the SEM is performed. At each SEM, an electron beam emitted from an electron source is focused by a plurality of stages of lenses, and the focused electron beam is one-dimensionally or two-dimensionally scanned across a sample by a scanning deflector.

Secondary electrons (SE) or backscattered electrons (BSE) emitted from the sample as a result of being scanned with the electron beam are detected by a detector, and stored on a storage medium, e.g., frame memory, etc., in synchrony with the scanning by the scanning deflector. The image signal stored on this frame memory is accumulated by a processing device provided within the control device. In addition, the scanning deflector is capable of scanning in any given size, position, and direction.

Images and signals obtained through electron beam scanning are sent to the data management device 1203 via the network. It is noted that although, in the present example, a description is provided assuming that the control device that controls the SEM and the data management device that performs measurement based on signals obtained by the SEM are separate entities, this is by no means limiting. Device control and measurement processes may be performed together at the data management device, or SEM control and measurement processes may be performed in conjunction at each control device.

In addition, a program for executing measurement processes is stored on the above-mentioned data management device or control device, and measurements or computations are performed in accordance with this program. Further, the data management device 1203 is configured to be able to read data from a design data database 1204 that accumulates design data, e.g., photomasks (hereinafter sometimes referred to simply as masks), etc., that are used in semiconductor fabrication processes. This design data is represented in, for example, GDS format or OASIS format, etc., and stored in a predetermined format. It is noted that the design data may be of any type so long as the software that displays the design data is able to display that format and to handle it as graphic data.

In addition, the data management device 1203 is equipped with a function of creating a program (recipe) for controlling the operations of the SEM based on semiconductor design data, and functions as a recipe set up unit. Specifically, it sets up locations, etc., for performing processes that are necessary for an SEM, such as desired measurement points, auto focus, auto stigma, addressing points, etc., with respect to design data, pattern contour data, or simulated design data, and creates a program for automatically controlling the sample stage, deflector, etc., of the SEM based on such settings. It is noted that template matching methods that use reference images called templates are methods in which a template is moved within a search area for finding the desired site, and a site with the highest degree of match with the template among the search area, or whose degree of match is equal to or greater than a predetermined value, is identified. The control device the SEM is provided with executes pattern matching based on a template, which is one type of registered information of a recipe. In addition, a program for performing matching using a normalized correlation method, etc., is stored on the control device, and the control device functions as a computer that executes this program.

It is noted that a simulator that simulates how well a pattern is formed based on design data may be connected to the data management device 1203, and a simulated image obtained by the simulator may be GDS-formatted and be used in place of design data. Information for automatically generating templates based on specified conditions is stored in a template database 1205.

Figure 13:
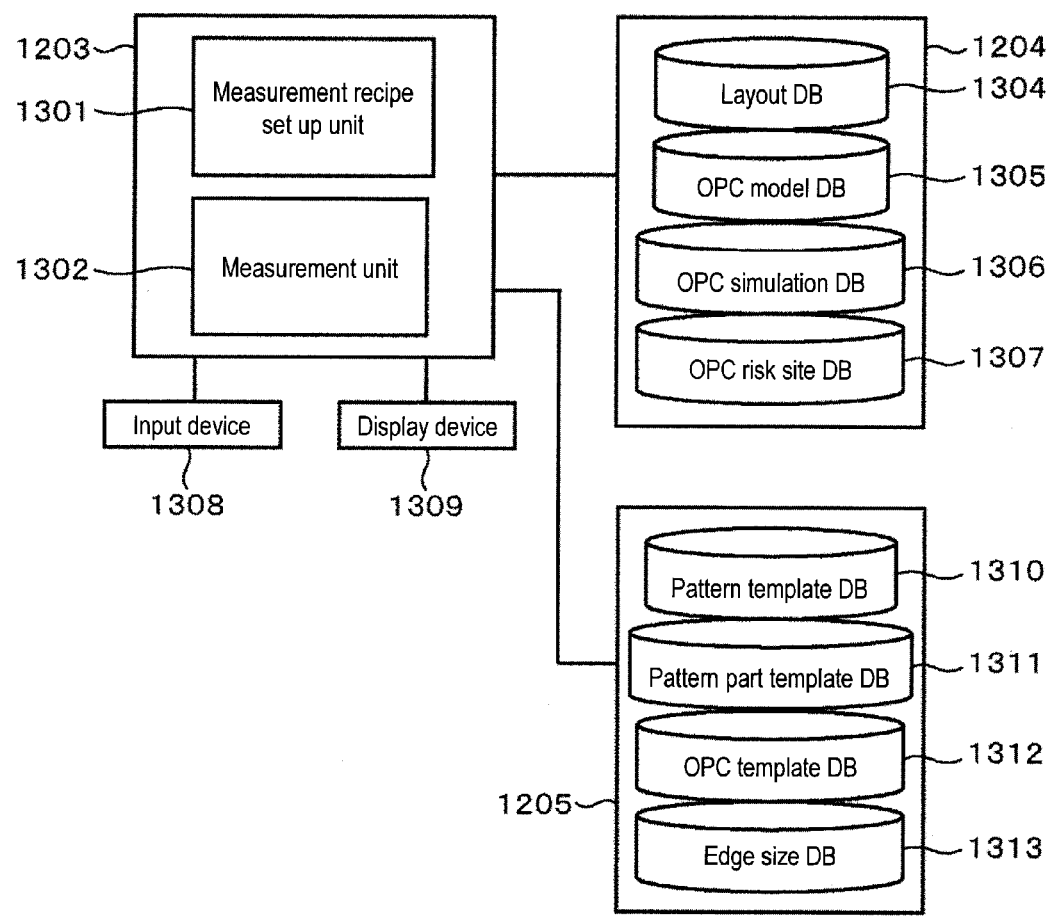
FIG. 13 is a diagram illustrating the relationship between a processing device comprising a measurement recipe set up unit and a database in which data required for setting up a recipe is accumulated.

FIG. 13 is a schematic configuration diagram of the data management device 1203, the design data database 1204, and the template database 1205. The data management device 1203 comprises a measurement recipe set up unit 1301 and a measurement unit 1302. The measurement recipe set up unit 1301 is configured to execute mainly the creation of a recipe using design data of a semiconductor device, etc., and the measurement unit 1302 is configured to execute mainly data processing based on the obtained SEM image. In addition, the data management device 1203 is configured to be capable of accessing design data stored on an internal or external storage medium, and is configured to be capable of reading or writing data as required. The design data database 1204 comprises: a layout database 1304 that stores layout design data (CAD data, etc.) of semiconductor patterns; an OPC model database 1305 that stores design data of mask patterns on which an OPC (Optical Proximity Correction) process has been performed based on layout data, etc.; an OPC simulation database 1306 that stores pattern shapes obtained by performing OPC simulation; and an OPC risk site database 1307 that stores information on OPC risk sites identified through OPC simulation.

The design data stored in the design data database 1204 may be of any type so long as it is of a format that allows graphics (e.g., pattern contours) based on the design data to be displayed by image displaying software used by the data management device 1701, etc. In addition, the design data is converted from circuit design data, and thus bears relationship with circuit design data, and it is pre-identified which signal transmission path in the circuit design data a given graphic in the pattern layout corresponds to.

The data management device 1203 comprises: an input device 1308 for inputting necessary information; and a display device 1309 that displays a later-discussed GUI screen, measurement results, SEM images, design data, morphed design data, etc. It also comprises: an input/output interface for exchanging data and signals with other external devices; ROM that stores programs related to semiconductor wafer defect inspection/analysis, constants required for processing, etc.; a processing unit that performs various processing; RAM that temporarily stores processing results, data that is being processed, etc.; a storage unit that stores various data; and so forth.

The data stored in the OPC simulation database 1306 is information simulating a pattern shape to be formed on a wafer after exposure based on information stored in the OPC model database 1305, as well as on the exposure device and exposure conditions used, and so forth. Further, based on this simulation result, information regarding sites where the difference between the predicted shape of a pattern and the shape of the design data exceeds a threshold is stored in the OPC risk site database 1307. Such simulations may be performed by an external simulator, or they may be performed at the data management device 1203 by executing a predetermined program.

At the measurement recipe set up unit 1301, SEM image acquisition conditions, or measurement result acquisition conditions, for an externally connected SEM are set up based on instructions from the input device 1308, etc. Specifically, coordinates of the image to be acquired, pixel size, beam diameter, beam accelerating voltage, threshold with respect to detected secondary voltage, etc., are set and stored on a predetermined storage medium.

Data regarding desired pattern size may be pre-registered in the design data database 1204, or it may be inputted through the input device 1308.

Information for morphing a pattern based on the inputted data regarding desired pattern size and on a predetermined rule is accumulated in the template database 1205.

Figure 2:
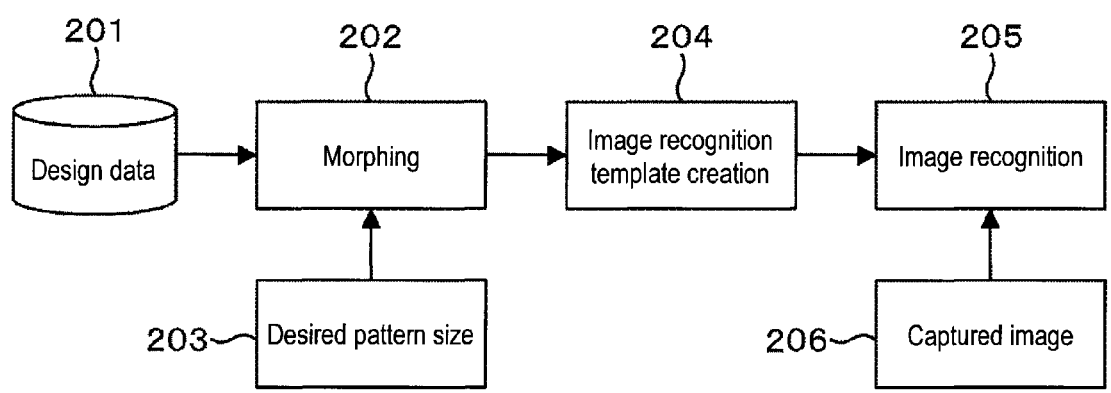
FIG. 2 is a diagram illustrating a process of creating a template using desired pattern size and design data.

FIG. 2 is a diagram illustrating a process in which a pattern shape is morphed based on design data and desired pattern size, and in which image recognition is performed with the morphed pattern image as a template. Design data such as layout data, etc., is obtained from the design data database 1204 shown by way of example in FIG. 12 and FIG. 13, or from an external EDA (Electrical Design Automation) tool. First, in order to morph design data 201 that has been read, a desired pattern size 203 is entered via a GUI (Graphical User Interface) screen such as that discussed later, or read from the design data database 1204, etc. Based on the entered or read desired pattern size, the design data is morphed (202). Specific methods for morphing are discussed later. Next, based on the morphed pattern, an image recognition template is created (204). Such an image recognition template is created at the measurement recipe set up unit 1301 and registered as a recipe for measurement. In the case of an SEM such as that shown in FIG. 1 by way of example, image recognition (205) is executed with respect to a captured image (206) that has actually been acquired and based on the created recipe.

Figure 3:
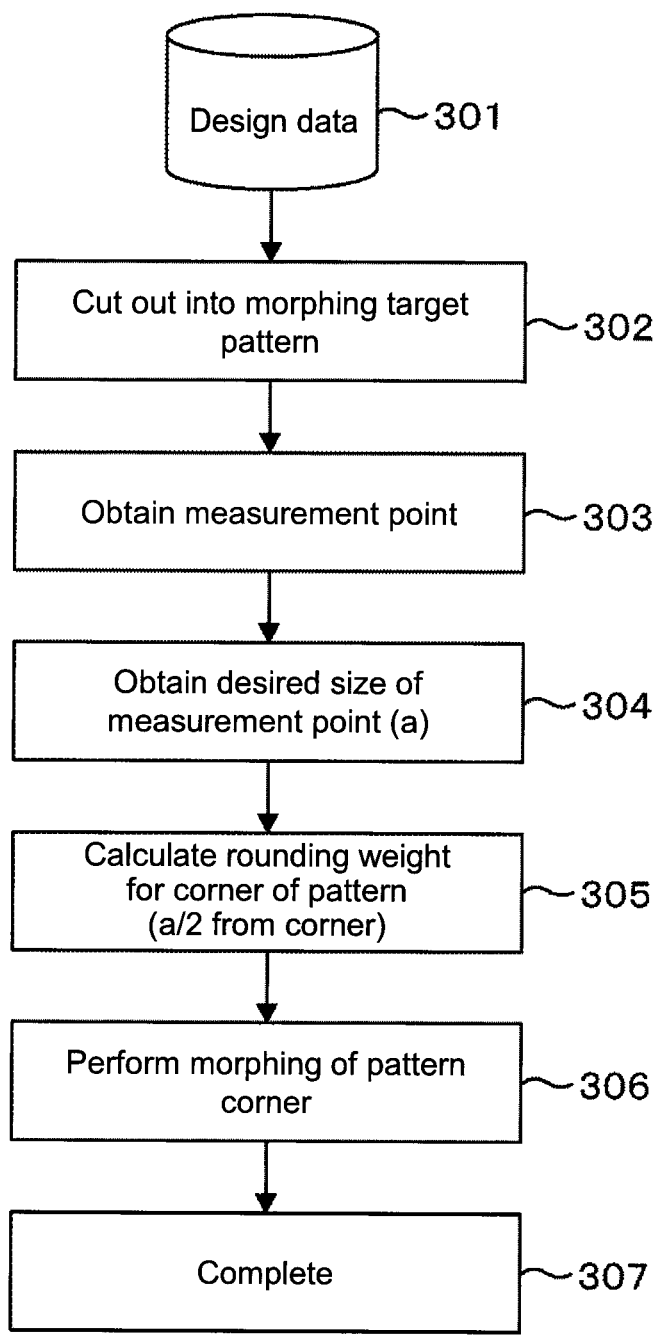
FIG. 3 is a flowchart illustrating a process of creating a template using desired pattern size.

FIG. 3 is a flowchart illustrating a process in which a pattern is morphed based on desired pattern size. In this flowchart, a process of rounding a pattern end is selectively described. First, from design data (301), a morphing target area containing a pattern that is to be a measurement target is cut out (step 302). This morphing target area later serves as a matching template. Next, information on a measurement point (length measurement point) that has been set is obtained (step 303). Next, the desired size of the measurement point is obtained (step 304). In this case, the desired pattern size may be inputted as discussed above, or pre-registered information may be read. Next, based on information regarding the obtained desired pattern size, the curvature of a corner part of the pattern end is computed (step 305).

Figure 4:
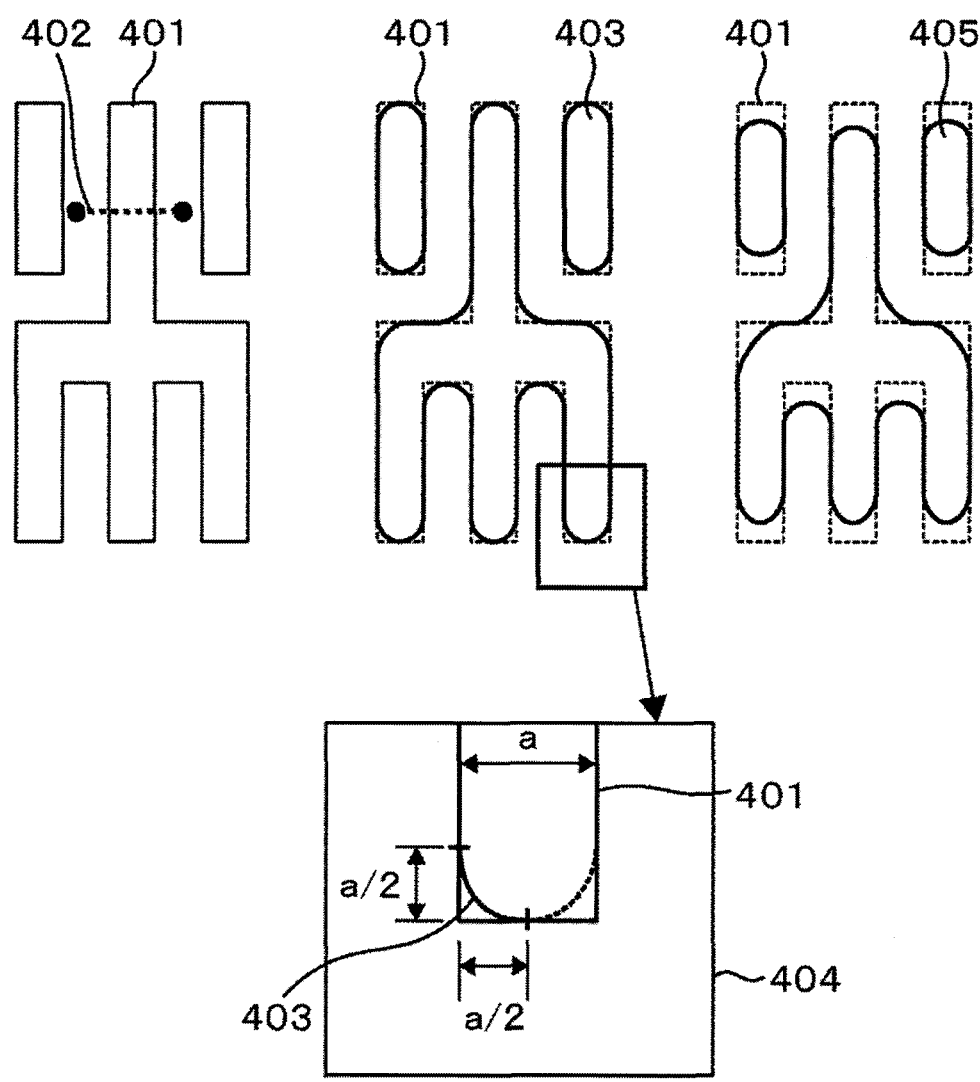
FIG. 4 is a diagram illustrating an example in which design data is morphed based on desired pattern size.

FIG. 4 is a diagram illustrating a process in which design data is morphed by setting a length measurement part 402 with respect to design data 401. In the present embodiment, an example where a pattern is morphed based on the desired pattern size of a length measurement point is described. With respect to desired pattern size "a", a vertex of a pattern is morphed in such a manner that the vertex part forms an arc that is part of a circle whose radius is "a/2". In other words, the pattern vertex is morphed so as to make the curvature be 2a. It is noted that although, in the present embodiment, an example where the curvature is 2a is described, this is by no means limiting, and morphing may be performed with a different curvature or to obtain a curve represented by a multi-degree equation. Such a relational expression for desired pattern size, curvature of pattern vertex part, etc., is pre-registered in the template database 1205, and the above-mentioned computation is carried out based on the desired pattern size setting. Pattern 403 shown in FIG. 4 by way of example is a pattern where the pattern vertices have been morphed so as to make the curvature be 2a. Partial region 404 is an enlarged view of a pattern end on which pattern morphing is performed.

By thus performing pattern morphing with the desired pattern size as a reference, it is possible to form a template of a shape that conforms to the semiconductor designer's intent.

The pattern 403 shown in FIG. 4 by way of example is a result obtained for a case where the pattern corner rounding weight is a/2. The line end length itself is the same as that of the design data. On the other hand, if it is known by experience that the line ends of the pattern that is actually formed turns out to be shorter relative to the design data, pattern morphing may also be performed in such a manner as to selectively make the curvature in the longitudinal direction of the lines be greater, or to shorten line ends by a predetermined amount relative to the design data. Pattern 405 shown in FIG. 4 by way of example illustrates an example where the lengths of the lines in the longitudinal direction are shortened. In addition, it is preferable that the curvature of the pattern be adjustable as desired. In the present embodiment, by pre-registering in the template database 1205 the relationship between desired pattern size and degree of pattern morphing, it is possible to perform, with ease, pattern morphing that suits the template without having to go through complex steps such as performing exposure simulation, etc. By performing pattern morphing (step 306) based on a process such as that above and registering the morphed pattern as a template, a pattern morphing process is completed (step 307).

Figure 5:
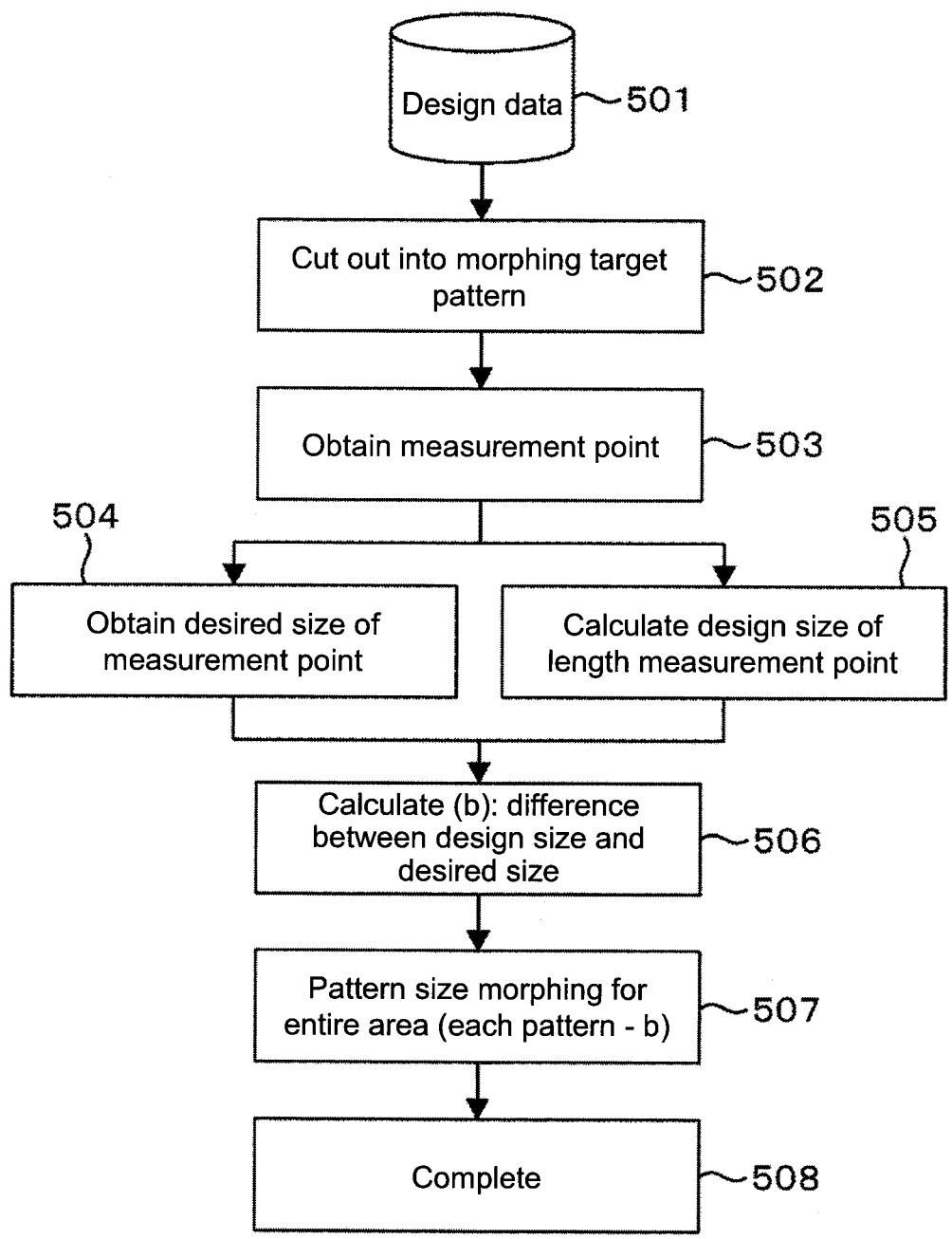
FIG. 5 is a flowchart illustrating a process of creating a template based on the difference between desired pattern size and design data.

FIG. 5 is a flowchart illustrating a process in which pattern morphing is performed based on desired pattern size and on design size that the design data has. Steps 502 and 503 are the same as steps 302 and 303 in FIG. 3. In the flowchart shown in FIG. 5 by way of example, the desired pattern size is obtained while at the same time also obtaining the pattern size of the layout data registered in the design data database 1204, the difference between the two is found (step 506), and the size of the pattern as a whole is changed based on this difference information (step 507). In other words, based on a one-dimensional information setting, namely, the desired pattern size, a two-dimensional adjustment, namely morphing the contour shape of the pattern as a whole, is performed.

Figure 6:
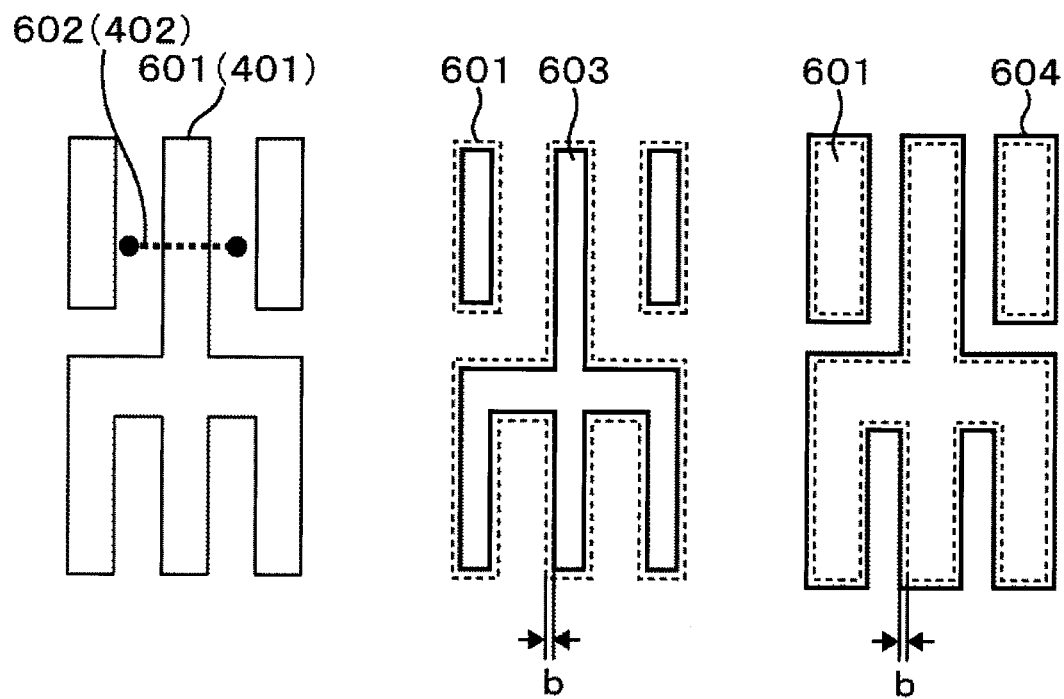
FIG. 6 is a diagram illustrating an example in which a pattern is morphed based on desired pattern size.

FIG. 6 is a diagram illustrating an example where the shape of a pattern as a whole is morphed based on the setting of a length measurement part 602 with respect to a pattern 601 of design data. The diagram in the center of FIG. 6 is a diagram illustrating a morph example where it is speculated that the size difference between the desired pattern size and the design data is "b" and that the actual pattern shrinks relative to the design data (i.e., the desired pattern size becomes smaller). As shown in the diagram in the center of FIG. 6 by way of example, the pattern is made smaller by dimension "b" in both the vertical and horizontal directions of the pattern. On the other hand, the diagram on the right in FIG. 6 illustrates a morph example where the desired pattern size becomes bigger relative to the design data.

According to the method above that allows pattern morphing to be performed based on size information, it becomes possible to form a template image with ease. In particular, since, in semiconductor fabrication plants, the size of a pattern varies significantly depending on the conditions of a stepper, which is one type of semiconductor fabrication device, or on the conditions of an etching device, it becomes possible to perform pattern morphing commensurate with the desired pattern size setting of these devices for each semiconductor fabrication process.

In addition, with current lithography simulations, it is not possible to perform simulations that take etching processes into consideration, and it is difficult to create a template that is based on design data. However, with a pattern morphing method that is based on desired pattern size, it becomes possible to create an optimal design template regardless of the type of process device at the semiconductor fabrication plant.

Figure 7:
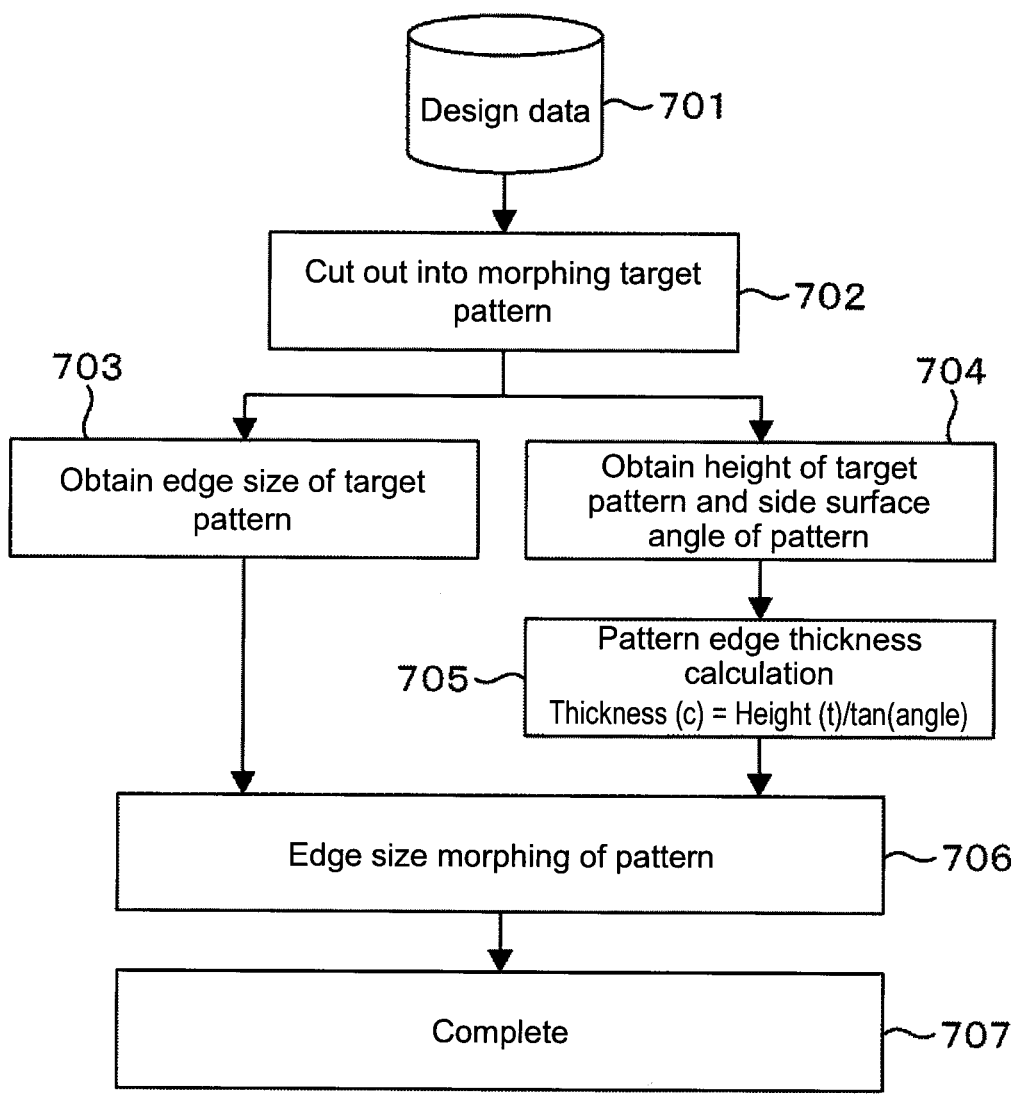
FIG. 7 is a flowchart illustrating a process of forming a template based on angle information of a pattern side surface.

FIG. 7 is a flowchart illustrating a pattern edge size morphing process. Unlike design data, in an actual image of a pattern that is actually formed, pattern edges are represented thickly. This is because edges of a pattern that is actually formed are formed with a certain slope. In addition, in the case of a scanning electron microscope image, due to an edge effect caused by a beam being incident on a sloped site, the amount of secondary electrons emitted becomes relatively greater, as a result of which the edge parts are displayed more brightly. The flowchart in FIG. 7 is related to a method of reproducing such edge parts in a simple manner based on design data.

Step 702 is the same as step 302 in FIG. 3. In the flowchart shown in FIG. 7 by way of example, the morphing of edge parts is made possible by specifying the edge size of the target pattern. One such method is a method in which the edge size is altered (step 706) based on the setting or reading (step 703) of the edge size of the target pattern. Another such method is a method in which the pattern edge thickness is calculated (step 705) based on the setting or reading (step 704) of height and side surface angle information of the target pattern, and in which the edge size is altered (step 706) based on that calculation.

By thus morphing the edge parts based on desired size settings, etc., regarding the pattern edges, it becomes possible to create a template that reproduces the edge parts with ease.

Figure 8:
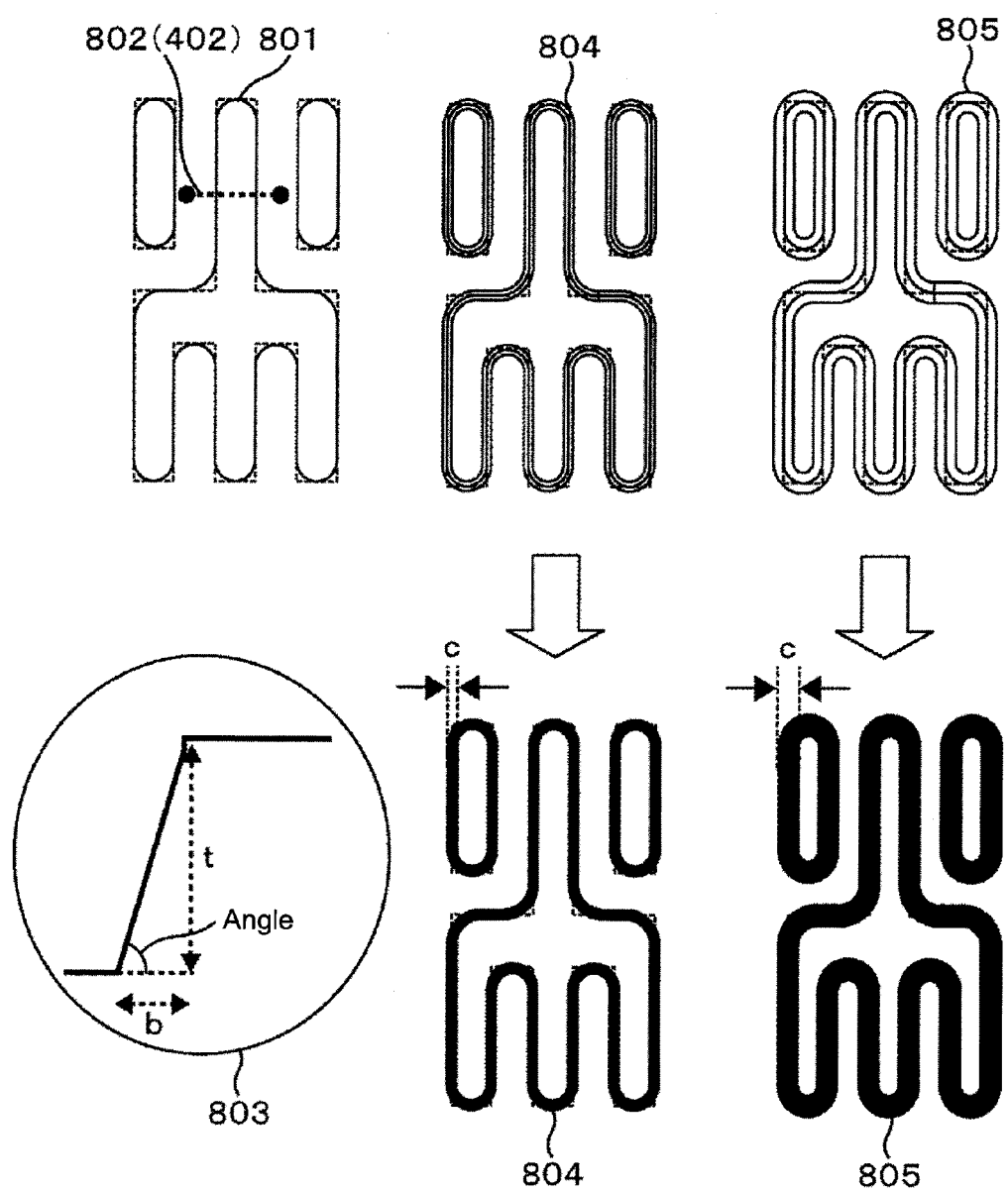
FIG. 8 is a diagram illustrating an example in which a template is formed based on angle information of a pattern side surface.

FIG. 8 is a diagram illustrating an example where the edge size is morphed based on a specified pattern edge size, etc. In particular, with respect to the example in FIG. 8, the example described is one where, based on the setting of a length measurement part 802 with respect to a pattern 801 of design data, the desired pattern size of the length measurement part 802 is read, or a desired pattern size is specified, and where the edge parts are morphed by reading an edge size stored in association with the above-mentioned desired pattern size, or based on a separately specified edge size. If the edge thickness is to be calculated based on the height of the target pattern and the side surface angle of the pattern, edge thickness c is calculated by height (t)/tan(side surface angle). Based on a value thus calculated, the thickness of the edge parts is varied.

Pattern 804 in the center of FIG. 8 is a diagram illustrating an edge part morph example for a case where the pattern height is relatively low, or where the side surface slope angle is small, and the diagram on the right in FIG. 8 for a case where the pattern height is relatively high, or where the side surface slope angle is large. When the height (t) of the pattern is low and the slope angle of the side surface of the pattern is large, the edge thickness of the pattern becomes narrow as in pattern 804 in FIG. 8. When the height (t) of the pattern is high and the slope angle of the side surface of the pattern is small, the edge thickness of the pattern increases as in pattern 805 in FIG. 8. In addition, if there is no information regarding the height of the pattern and the slope angle, the edge thickness of the pattern may also be obtained directly as in step 703 in FIG. 7 to perform pattern edge thickness morphing.

As discussed above, by changing the pattern edge thickness of the design data, it is possible to better optimize an image recognition template that uses the design data.

Figure 9:
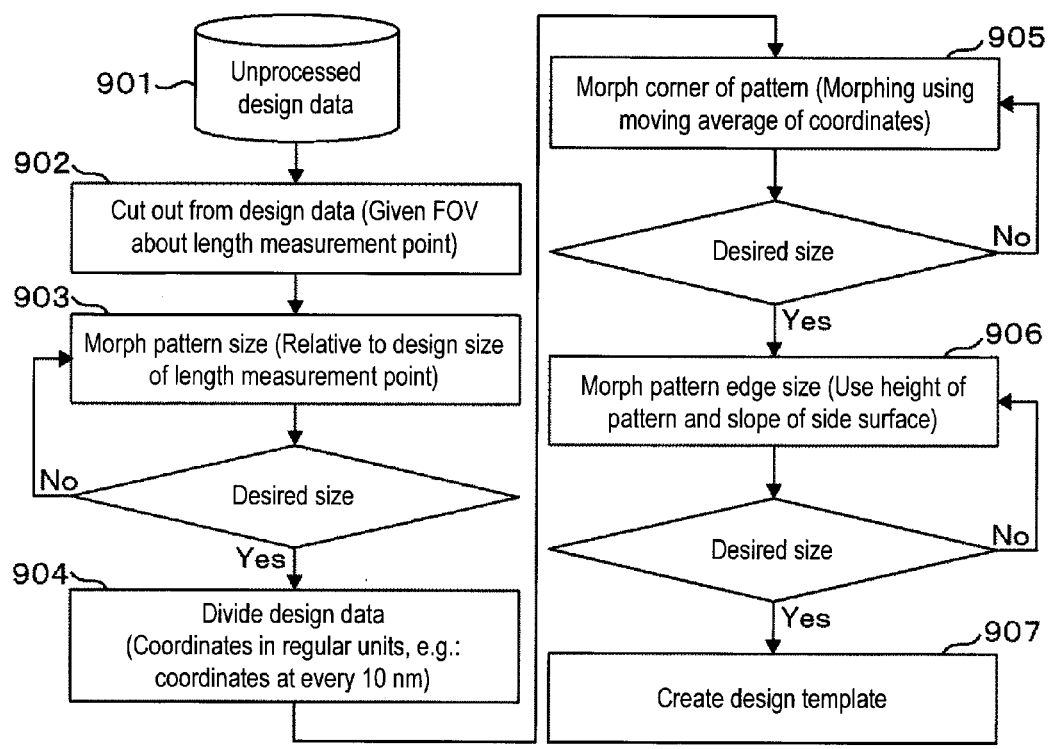
FIG. 9 is a flowchart illustrating a process of creating a template based on design data.
Figure 10:
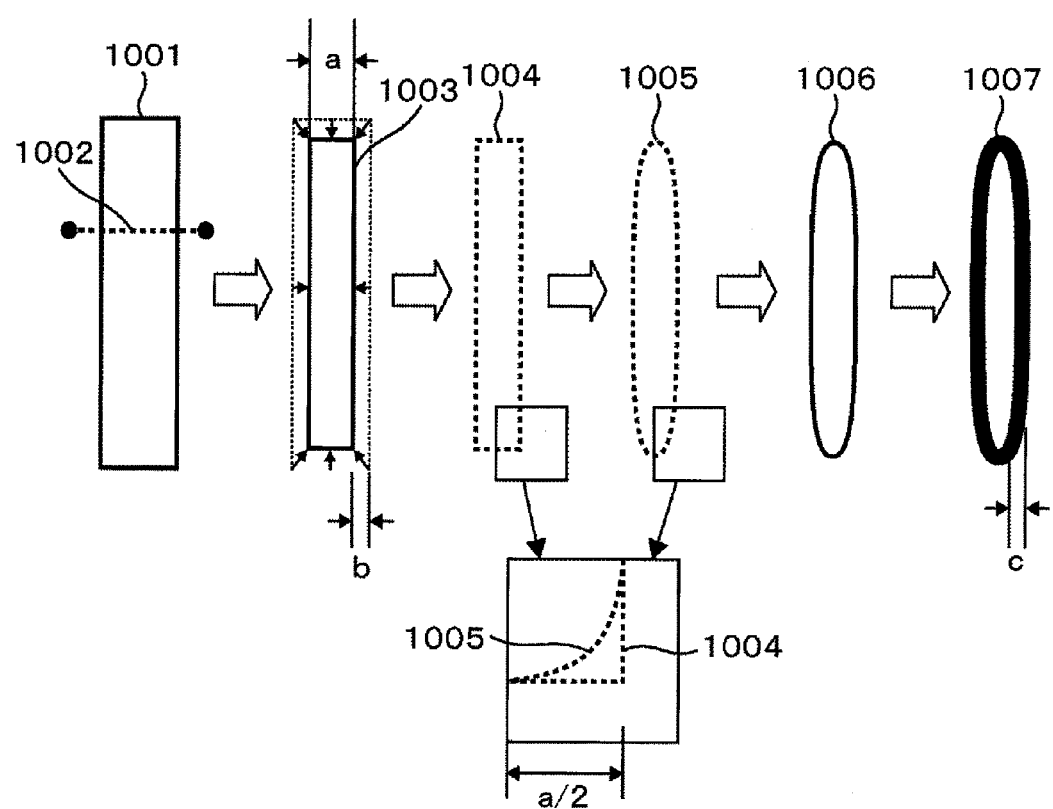
FIG. 10 is a diagram illustrating an example in which a template is created based on design data.

FIG. 9 is a flowchart illustrating a process in which a template is created by altering the vertices and edge size of a pattern based on design data and information regarding desired pattern size. Further, in the present embodiment, a description is also provided with respect to an example where pattern morphing is performed by dividing line segments of design data and performing a moving average of coordinates. First, from design data (901), a morphing target area containing a pattern that is to be a measurement target is cut out (step 902). FIG. 10 shows by way of example a pattern that has been cut out and a morphing process for that pattern. A length measurement part 1002 is set over a pattern 1001 that has been cut out, and pattern morphing is performed based on this setting and a desired pattern size setting. In performing this morph, it is determined whether or not a measurement point that has been set satisfies the desired pattern size that has been set, and pattern morphing is performed if not (step 903). Next, as shown through pattern 1004 by way of example, the morphed design data is divided at regular intervals (step 904). With respect to the vertex parts of the design data on which a division process has thus been performed, the shape is changed in such a manner as to change its curvature (step 905). In so doing, morphing that utilizes a moving average of coordinates is performed.

A process of rounding the vertices of the pattern is realized by performing a moving average of coordinates. In other words, the index representing the extent to which the pattern corners are to be rounded in this case becomes the weight (a) of the moving average of coordinates.

Pattern 1005 shown in FIG. 10 by way of example is a pattern shape after a pattern corner rounding process that uses the moving average of coordinates has been performed. Pattern 1006 is formed by connecting the coordinates that define the pattern contour after the pattern corner rounding process that uses the moving average of coordinates. With respect to pattern 1006 thus formed, by altering the edge size based on pattern height and side surface slope information, or on inputted information, pattern 1007 is generated (step 906). Pattern 1007 thus formed is registered as a template (step 907).

By creating a template through a process like the one above, it becomes possible to create a template resembling the actual image through a simple procedure, such as inputting the desired pattern size.

Figure 11:
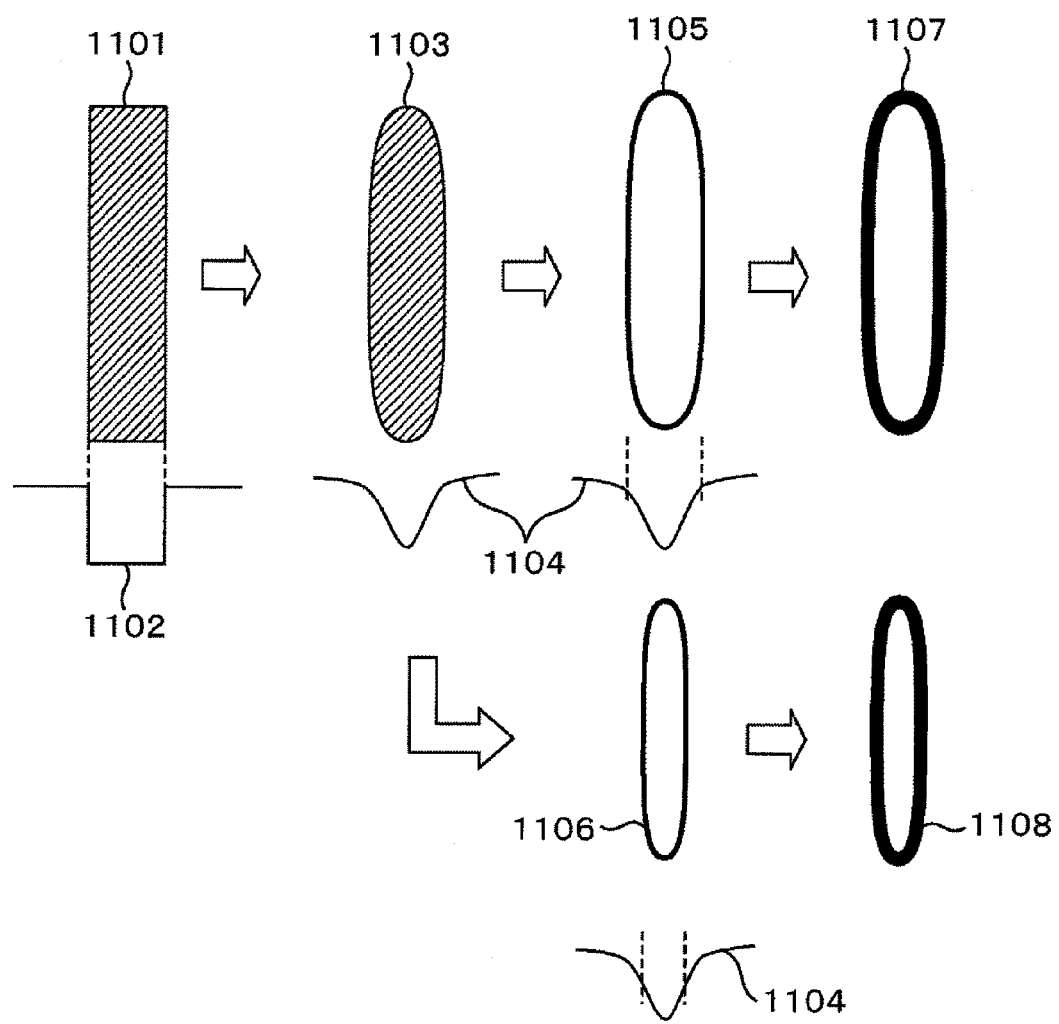
FIG. 11 is a diagram illustrating an example in which a template is created based on design data.

FIG. 11 is a diagram illustrating an example of a method of morphing a pattern by blurring design data through image processing.

First, pattern 1101 is formed by filling the interior of a closed figure representing a pattern in the design data through image processing. Profile 1102 is a contrast profile indicating the change in brightness of pattern 1101. Pattern 1103 is generated by performing an image blurring process, e.g., a smoothing process, etc., on pattern 1101 on which a filling process has thus been performed. The level of rounding may be adjusted by adjusting the level of blurring. Profile 1104 is a contrast profile of pattern 1103 that has undergone a blurring process.

As shown in the upper diagrams and lower diagrams in FIG. 11 by way of example, the level of rounding of pattern vertices may be adjusted by adjusting the level of blurring. Further, even the size of the pattern may be adjusted, as shown in the upper diagrams and lower diagrams in FIG. 11 by way of example, by adjusting the threshold of profile 1104.

By performing a pattern edge thickness adjustment on patterns 1105 and 1106 thus formed, it becomes possible to create image recognition templates that better resemble captured images, as in patterns 1107 and 1108.

Figure 14:
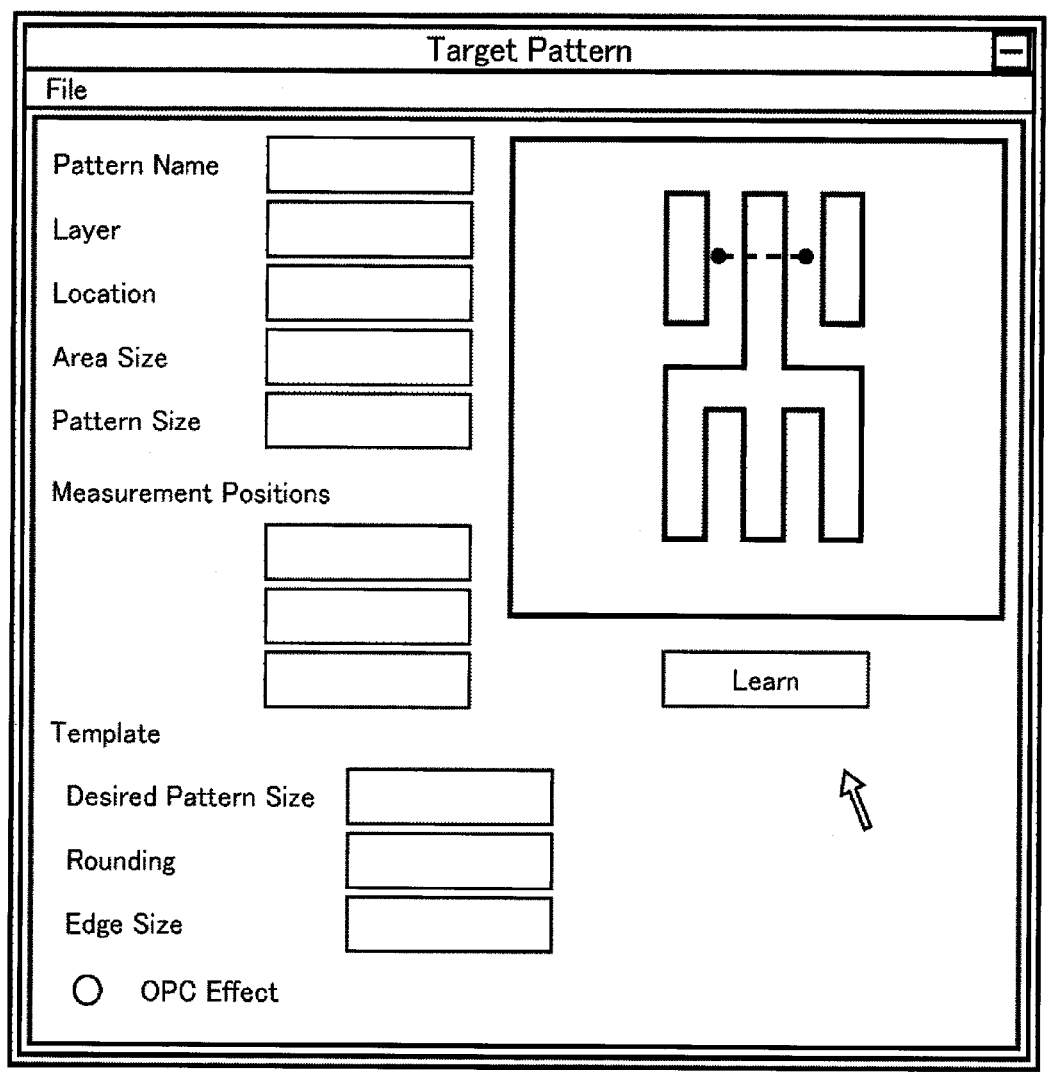
FIG. 14 is a diagram illustrating an example of a GUI screen for entering template creation conditions.

FIG. 14 is a diagram illustrating an example of a GUI screen for setting length measurement points and template creation conditions based on design data. The operator specifies information regarding a measurement area by specifying, through this screen, the name of the pattern or the area where the pattern is located (Pattern Name), the layer where the pattern is located (Layer), the coordinates where the pattern is located (Location), the size of the image that is to be actually acquired (Area Size), etc. In addition, specifications of length measurement parts are entered in the Measurement Positions boxes.

The desired pattern size of the template is entered under "Desired Pattern Size". In addition, the level of rounding of pattern vertex parts and the edge size are respectively entered in the "Rounding" and "Edge Effect" boxes. Based on information that is inputted through such a GUI screen, the measurement recipe set up unit 1301 shown in FIG. 13 by way of example reads pattern data from the design database 1204, while at the same time morphing the pattern in accordance with pattern morphing conditions registered in the template database 1205. It is noted that the desired pattern size may be any given inputted value, or if it is pre-stored, that value may be read and used as well.

In addition, a plurality of databases in which morphing conditions for morphing pattern shapes based on desired pattern data are registered are stored in the template database 1205. By way of example, a program for morphing a selected pattern as a whole in accordance with pre-defined conditions is stored in a pattern template database 1301. A program for performing pattern morphing per pattern part (e.g., pattern end, inner corner, outer corner, etc.) in accordance with pre-determined conditions is stored in a pattern part template database 1311.

Further, pattern shapes that occur as a result of adding an OPC pattern are registered in an OPC template database 1312. Relationships between desired pattern size and edge size are registered in an edge size database 1313.

With respect to the information registered in each of the databases above, in order to enable adjustment of the size, etc., thereof in accordance with the desired pattern size that is set, there is provided an algorithm for shape or size adjustment that is in accordance with the desired pattern size. By way of example, while pattern end shape information is registered in the pattern part template database 1311, it is programmed to adjust the size in accordance with the desired pattern size that is set. More specifically, by way of example, if the line end shape is an arc shape comprising a portion of a true circle, by changing the diameter in accordance with the desired pattern size that is set, it is matched with the width of a line part formed based on the desired pattern size. By pre-registering a program capable of such an adjustment, the operator becomes able to create a template by simply setting the desired pattern size. In addition, by enabling fine partial adjustments, shape correction becomes possible without significantly compromising the shape that is based on the desired pattern size. In particular, in cases where the pattern becomes partially morphed due to the optical proximity effect, if those parts can be corrected appropriately while maintaining the desired pattern size, it becomes possible to reproduce, with little effort, a template of a shape that is faithful to the pattern shape that is transferred to a semiconductor wafer.

In addition, partial shape information that is brought about by the existence of an OPC pattern is pre-registered in the OPC template database 1312. By morphing such partial shapes in accordance with the desired pattern size, they are set as partial shapes of templates. Further, edge information per pattern size is registered in the edge size database 1313, and the configuration is such that when a desired pattern size is selected, edge thickness information corresponding to that size is read.

All of the information registered in the databases above can be morphed in size or shape in accordance with the desired pattern size setting. By selecting an appropriate database, the operator is able to morph patterns with the desired pattern size as a reference. In addition, shape information may be pre-registered per desired pattern size.

REFERENCE SIGNS LIST

101 Electron gun cathode
102 First anode
103 Second anode
104 Primary electron beam
105 Condenser lens
106 Objective lens
107 Wafer (sample)
108 Two-stage deflection coil
109 Deflection control device
110 Secondary electron
111 Secondary electron detector
112 Amplifier
113 CRT

The invention claimed is:

1. A pattern matching image forming apparatus comprising a processing device that creates, based on design data of a sample, a template for performing pattern matching with respect to a search image of the sample, wherein
the processing device shrinks or enlarges the design data of the sample based on a desired pattern size, morphs, in accordance with the desired pattern size, a partial shape of a pattern that has been shrunk or enlarged, adds to the morphed pattern an edge based on an edge size of the pattern computed using height information and side surface angle information of the pattern, and stores the morphed pattern having the edge as the template.

2. The pattern matching image forming apparatus according to claim 1, wherein the processing device shrinks or enlarges the design data in accordance with a difference between a size of the design data and the desired pattern size.

3. The pattern matching image forming apparatus according to claim 1, wherein the processing device adds to the enlarged or shrunk pattern an edge having a predetermined thickness.

4. The pattern matching image forming apparatus according to claim 1, wherein the processing device executes pattern morphing per partial area of the pattern that becomes the template.

5. The pattern matching image forming apparatus according to claim 1, wherein the processing device shrinks or enlarges the pattern two-dimensionally in accordance with a one-dimensional desired pattern size of the pattern.

6. The pattern matching image forming apparatus according to claim 1, wherein the processing device morphs a vertex part of a pattern end of the pattern to be of a curvature corresponding to a size of the desired pattern size.

* * * * *